US010264494B2

(12) United States Patent
Ma et al.

(10) Patent No.: US 10,264,494 B2
(45) Date of Patent: Apr. 16, 2019

(54) METHOD AND DEVICE FOR SENDING INDICATION INFORMATION, AND USER EQUIPMENT

(71) Applicant: ZTE Corporation, Shenzhen (CN)

(72) Inventors: Zijiang Ma, Shenzhen (CN); Hongjun Liu, Shenzhen (CN); Chen Lu, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 181 days.

(21) Appl. No.: 15/109,166

(22) PCT Filed: Jun. 16, 2014

(86) PCT No.: PCT/CN2014/079978
§ 371 (c)(1),
(2) Date: Jun. 30, 2016

(87) PCT Pub. No.: WO2015/100954
PCT Pub. Date: Jul. 9, 2015

(65) Prior Publication Data
US 2016/0323784 A1 Nov. 3, 2016

(30) Foreign Application Priority Data

Dec. 31, 2013 (CN) .......................... 2013 1 0752082
Jan. 21, 2014 (CN) .......................... 2014 1 0026358

(51) Int. Cl.
*H04W 36/00* (2009.01)
*H04W 36/08* (2009.01)
(Continued)

(52) U.S. Cl.
CPC ....... *H04W 36/0022* (2013.01); *H04W 36/08* (2013.01); *H04W 72/042* (2013.01); *H04W 76/10* (2018.02)

(58) Field of Classification Search
CPC ..... H04W 36/08; H04W 72/04; H04W 76/02; H04W 36/0022; H04W 72/042
See application file for complete search history.

(56) References Cited

U.S. PATENT DOCUMENTS

2011/0077006 A1* 3/2011 Hsu ................... H04W 36/0007
455/436
2011/0305184 A1* 12/2011 Hsu ....................... H04W 72/00
370/312
(Continued)

FOREIGN PATENT DOCUMENTS

CN 101883327 A 11/2010
CN 102378113 A * 3/2012 .............. H04W 4/06
(Continued)

OTHER PUBLICATIONS

International Search Report for corresponding application PCT/CN2014/079978 filed on Jun. 16, 2014; dated Sep. 29, 2016.
(Continued)

*Primary Examiner* — Charles C Jiang
*Assistant Examiner* — Kyaw Z Soe
(74) *Attorney, Agent, or Firm* — Cantor Colburn LLP

(57) ABSTRACT

Provided are a method and device for sending indication information, and UE. In the method, a UE sends to a network side, when determining that the UE has left an MBSFN area capable of carrying a predetermined MBMS, indication information for triggering the network side to set up a bearer for the UE to transmit the predetermined MBMS. The technical problem in the related art that a network side usually fails to know that UE moves to a cell unable to carry an MBMS, so that the network side cannot ensure service continuity and thus reception of the MBMS by a user side is interrupted is solved. The network side knows in time that the UE has left the MBSFN area capable of carrying the predetermined MBMS that is being received or is prepared
(Continued)

to be received, and the network side can take measures in time to ensure MBMS continuity.

16 Claims, 9 Drawing Sheets

(51) Int. Cl.
 *H04W 72/04* (2009.01)
 *H04W 76/10* (2018.01)

(56) References Cited

U.S. PATENT DOCUMENTS

| 2012/0236776 | A1* | 9/2012 | Zhang | H04W 48/12 |
| | | | | 370/312 |
| 2013/0039250 | A1* | 2/2013 | Hsu | H04H 20/71 |
| | | | | 370/312 |
| 2013/0070660 | A1* | 3/2013 | Xu | H04W 72/005 |
| | | | | 370/312 |
| 2013/0083715 | A1* | 4/2013 | Etemad | H04W 52/04 |
| | | | | 370/312 |
| 2013/0229974 | A1 | 9/2013 | Xu et al. | |
| 2013/0301509 | A1* | 11/2013 | Purnadi | H04L 65/4076 |
| | | | | 370/312 |

FOREIGN PATENT DOCUMENTS

| CN | 102685684 A | 9/2012 |
| CN | 102740233 A | 10/2012 |
| CN | 103458371 A | 12/2013 |
| EP | 2302969 A1 | 3/2011 |
| WO | 2008137354 A1 | 11/2008 |
| WO | 2012019460 A1 | 2/2012 |
| WO | 2013182043 A1 | 12/2013 |

OTHER PUBLICATIONS

Extended European Search Report dated Dec. 8, 2016 re: Application No. 14876715.5-1854 / PCT/CN2014/079978, pp. 1-9, citing: US 2011/305184 A1, US 2013/229974 A1, WO 2013/182043 A1, WO 2008/137354 A1 and EP 2 302 969 A1.

* cited by examiner

METHOD AND DEVICE FOR SENDING INDICATION INFORMATION, AND USER EQUIPMENT

TECHNICAL FIELD

The present disclosure relates to the field of communications and particularly to a method and device for sending indication information, and User Equipment (UE).

BACKGROUND

Long-Term Evolution (LTE), which is a next generation mobile broadband network standard defined by Third Generation Partnership Project (3GPP), applies an Orthogonal Frequency Division Multiplexing (OFDM) technology and introduces technologies including Multiple Input Multiple Output (MIMO) and so on, and in the meanwhile, is able to support a bandwidth of 1.25 to 20 MHz, thus greatly improving a peak data rate and system capacity, and supporting a downlink peak rate of 100 Mbit/s and an uplink peak rate of 50 Mbit/s in a bandwidth of 20 MHz. Scheduling and radio resource control efficiency is enhanced by a flat network structure, and a continuing time delay is shortened.

A Multimedia Broadcast Multicast Service (MBMS) has been supported by the Third Generation (3G) mobile communications system, and an Enhanced Multimedia Broadcast Multicast Service (eMBMS) constructed in a fourth generation LTE system is viewed as a service with good application prospect in the industry. A method for implementing the eMBMS includes that an intelligent terminal having a video function receives a digital audio/video service in a broadcast/multicast form through a Physical Downlink Multicast Channel (PMCH), and 3GPP protocol standards have provided perfect solutions for implementation and networking methods of the eMBMS.

With the rapid development of the Internet and the popularization of multifunctional mobile terminals having large screens, a large number of mobile data multimedia services and various high bandwidth multimedia services have emerged, such as video conferences, television broadcasting, videos on demand, advertising, online education, interactive games and so on, which satisfies demands of a plurality of services of mobile users on one hand, and brings a new service increasing point for mobile operators on the other hand. It is required by these mobile data multimedia services that a plurality of users is able to receive the same data simultaneously, thus the mobile data multimedia services have features including large amounts of data, long durations and delay sensitivity and so on compared with a common data service.

The MBMS, which is provided by 3GPP so as to effectively utilize mobile network resources, is a technology for transmitting data from data from a data source to a plurality of target mobile terminals, so as to share resources of networks (including a core network and an access network), thus improving the utilization ratio of the network resources (especially a resource of an air interface). The MBMS defined by 3GPP is able to not only implement multicast and broadcast of a pure text low rate message, but also implement multicast and broadcast of a high speed multimedia service, thus providing various rich videos, audios and multimedia services, which undoubtedly complies with the development trend of mobile data in the future, and providing a better service prospect for 3G development.

A UE receiving the MBMS may be in either of the following two states: one of which is Radio Resource Control (RRC) connected (RRC-CONNECTED) and the other one is RRC idle (RRC_IDLE). It may be judged according to the fact whether the UE is receiving a unicast service, that the UE that is receiving the MBMS is in a connected state or an idle state. When receiving the unicast service, the UE is in the connected state, and the UE in the idle state is not in RRC connection with a network side while the UE in the connected state is in RRC connection with the network side.

If the UE is receiving the MBMS in an original cell (which may be also called as a current cell), after the UE leaves the original cell and resides in a target cell (if the UE is in a connected mode, the UE may be switched from the original cell to reside in the target cell, and if the UE is in an idle state, the UE may reside in the target cell from the original cell through a cell selection/reselection process, and the target cell may be also called as a new cell), the UE will read messages (an MBMS control signaling carried on an MBMS control channel, i.e. a Multicast Control Channel (MCCH), is called an MCCH message) of a Broadcast Control Channel (BCCH) and the MCCH to acquire resource configuration information of the MBMS in the target cell. If the target cell and the original cell belong to the same MBMS over a Single Frequency Network (MBSFN) area, that is, the target cell and the original cell belong to this MBSFN area, the UE may not need to read the resource configuration information of the MBMS after entering the target cell, and may directly use the resource configuration information of the MBMS of the original cell (the current cell) to receive the MBMS in the target cell, and a content of the MBMS is carried on an MBMS channel, i.e. a Multicast Traffic Channel (MTCH), thereby implementing MBMS continuity. Each MBMS is carried on one MTCH, and a content of only one MBMS is also carried on each MTCH. The so-called reading of the MTCH in the present disclosure refers to reading of the MBMS content on the MTCH channel. If the target cell and the original cell belong to different MBSFN areas, the UE needs to read the resource configuration information of the MBMS after entering the target cell. If the MBMS that needs to be received by the UE is not sent in the target cell, the UE fails to read the resource configuration of the MBMS after entering the target cell, thus failing the receive the MBMS.

Receiving states of a UE having an MBMS capability includes that the UE is receiving an MBMS and that the UE is interested in receiving an MBMS. That the UE is interested in receiving the MBMS means that the UE has not received the MBMS, but is prepared to receive the same. At the moment, the UE may monitor an MBMS notification message, and further reads an MCCH message and MBMS data according to the MBMS notification message.

Before section start of an MBMS, a Broadcast-Multicast Service Center (BM-SC) performs service announcement first so as to send brief introduction of the MBMS to a UE, such as an Electric Service Guide (ESG), and the announcement may be sent by the following methods: an MBMS bearer, or an interaction method, e.g. a Hypertext Transfer Protocol (HTTP) or a Picture Transfer Protocol (PTP) push method, such as a Short Message Service (SMS), a Multimedia Messaging Service (MMS), HTTP push and so on. The announcement may last after an MBMS session stops. A content of the ESG is carried on User Service Description (USD), and a user may read the ESG content carried on the USD so as to acquire, in advance, an MBMS Service Area (MBMS SA) represented by {TMGI, MBMS Service Area Identity (SAI) list} on the USD, of each MBMS (an MBMS in the present disclosure may be also called as a service for short, wherein a Temporary Mobile Group Identity (TMGI) corresponds to a certain MBMS, and a MBMS SAI list corresponds an SAI list of the service.

A process in which a user is interested in a certain MBMS and starts to read the service is as follows in the related art.

A UE has in advance known a TMGI/TMGIs corresponding to one or more MBMSs including an MBMS that the UE is interested in and it is provided that the MBMS that the UE is interested in is TMGI1. The UE resides in a certain cell, and if the UE is interested in a certain MBMS (provided that the MBMS that the UE is interested in is TMGI1), then the UE needs to find and initially (start) read TMGI1 through the following steps.

Firstly, a System Information Block (SIB) of the cell, which is carried on a BCCH channel, is read. If the UE is interested in a certain MBMS, the UE needs to read SIB 13 (an SIB numbered 13). Configuration information of one or more MCCHs is carried on SIB 13, and each MCCH corresponds to an MBSFN area. By reading SIB 13, the UE may read: 1) an MBSFN area Identifier (ID) corresponding to each MCCH, 2) a configuration parameter of each MCCH (i.e. radio resources where MCCHs are configured, thus facilitating the UE to further read MCCH messages on the radio resources).

Subsequently, the UE may read each MCCH message above to know whether the MBMS that the UE is interested in is carried on a certain MBSFN area. An MBSFN resource configured by an MBSFN area corresponding to each MCCH message, and scheduling information (the UE may know MBSFN resources on which MBMSs are specifically scheduled) of all MBMSs of the MBSFN area are carried on each MCCH message. Each MBMS corresponds to a unique MTCH. In other words, a content of each MBMS is uniquely carried on an MTCH. Specifically, by reading an MCCH message, the UE may read: 1) radio resources on which all MTCHs of an MBSFN area corresponding to the UE are respectively configured; 2) an MTCH on which the MBMS that the UE is interested in is further scheduled. For example, MBMS TMGI1 that the UE is interested in is configured on a certain MTCH of a certain MBSFN area.

Finally, the UE reads a content on the MTCH (e.g. MTCH1) corresponding to the MBMS that the UE is interested in, and further needs to continue reading an MCCH message corresponding to the service that the UE is interested in. Once resource configuration about the MTCH1 changes on the MCCH message, the UE may continue to read MTCH1 on a new radio resource.

In a word, the UE needs to read SIB 13 (MCCH configuration parameters may be acquired) and read MCCHs (an MTCH on which the service that the UE is interested in is carried may be found) and read the MTCH carrying the MTCH on which the service that the UE is interested in so as to find and initially (start) read TMGI1.

During a mobile process, a UE in an idle state generally enters a target cell by a cell selection or reselection flow, and a UE in a connected state generally enters a target cell by using a cell switching flow. Cell selection or reselection belongs to the mobility of the UE in the idle state, and aims at ensuring that the UE in the idle state resides in an optimal cell. In a wireless network, cell selection or reselection is a necessary process, mainly because of the mobility of a UE and the fluctuation of a wireless network, and resulting fluctuation in signal strength and interference levels.

A UE resides in an original cell, and the cell is in a state of receiving a certain MBMS of interest. When the UE moves from the original cell to a target cell, and resides in the target cell through cell selection/reselection (or a switching flow), according to the fact whether the original cell and the target cell belong to the same MBSFN area, the moving process of the UE may be further divided into Intra-MBSFN area mobility or Inter-MBSFN area mobility of the UE.

After the UE resides in a certain cell of a certain MBSFN area (set as MBSFN1) and is able to read the MBMS that the UE is interested in, the UE moves from the original cell (set as cell 1) to the target cell (set as cell 2). At the moment, the UE will read SIB 13 of the target cell so as to know whether there is a change in an MBSFN area of the target cell compared with that of the original cell, i.e. whether cell 2 belongs to the original MBSFN1, and whether the UE can continue receiving TMGI1.

On the other hand, a certain cell may be covered by a plurality of different MBSFN areas. In other words, the cell is in the coverage of the MBSFNs. For example, cell 1 is in overlapped coverage of {MBSFN1, MBSFN2} while cell 2 is in {MBSFN1, MBSFN3}, as shown in FIG. 1.

At the moment, when a UE moves from cell 1 to cell 2, the UE has intra-MBSFN mobility for MBSFN1 while having inter-MBSFN mobility for other MBSFN areas. If an MBMS which is currently received by the UE and the UE is interested in is carried on MBSFN1, the UE may receive the service on both cell 1 and cell 2. However, if the MBMS which is currently received by the UE and the UE is interested in is carried on MBSFN2, the UE moves from cell 1 to cell 2 and may fail to continue receiving the service on cell 2.

In the related 3GPP art, it is always assumed that MBMSs configured on two adjacent MBSFN areas are different. In other words, only the service continuity (the service continuity in the present disclosure indicates whether the UE is able to receive the same MBMS when moving between two cells) of an UE moving in the same MBSFN area is described in the related art, but the related art fails to research and provide the service continuity for a UE to receive the same service when the UE moves between different MBSFNs, especially a solution for maintaining the service continuity in a case that an MBSFN on a target cell fails to carry the MBSM. When the UE moves to a certain cell that cannot carry the MBMS, a network side usually fails to learn such a condition, thus the network side fails to ensure service continuity, the reception of the MBMS by a user side is interrupted and user experience is reduced.

At present, there is not effective solution yet for the problems in the related art.

SUMMARY

Aiming at the technical problem that a network side usually fails to know that a UE moves to a cell unable to carry an MBMS, so that the network side cannot ensure service continuity and thus the reception of the MBMS by a user side is interrupted in the related art, the embodiments of the present disclosure provide a method and device for sending indication information, and UE so as to solve the technical problem above.

A method for sending indication information is provided according to an aspect of the embodiments of the present disclosure, including that a UE determines that the UE has left an MBSFN area capable of carrying a predetermined MBMS, wherein the predetermined MBMS is an MBMS that is being received or is prepared to be received before the UE leaves the MBSFN area; and the UE sends indication information to a network side.

In an exemplary embodiment, that the UE determines that the UE has left the MBSFN area capable of carrying the predetermined MBMS may include one of the followings: in a case that the UE, after leaving an original cell and resides in a target cell, fails to acquire resource configuration information corresponding to the predetermined MBMS from an SIB of the target cell, UE determines that the UE has left the MBSFN area capable of carrying the predetermined MBMS; in a case that the UE detects that signal quality of the predetermined MBMS currently being received is lower than a signal quality threshold value, the UE determines that the UE has left the MBSFN area capable of carrying the predetermined MBMS; and in a case that the UE detects that a bit error rate of decoding the predetermined MBMS currently being received is higher than a bit error rate threshold value, the UE determines that the UE has left the MBSFN area capable of carrying the predetermined MBMS.

In an exemplary embodiment, a situation that the UE fails to acquire the resource configuration information corresponding to the predetermined MBMS from the SIB of the target cell may include that: the UE fails to acquire configuration information of an MCCH from the SIB of the target cell; or the UE acquires configuration information of an MCCH from the SIB of the target cell, but an MBSFN area corresponding to the MCCH in the SIB is not capable of carrying the predetermined MBMS.

In an exemplary embodiment, the method may further include that: when the UE fails to acquire the resource configuration information corresponding to the predetermined MBMS from the SIB of the target cell, the UE continues or starts to receive the predetermined MBMS in the target cell according to resource configuration information, which is acquired from an SIB of the original cell before leaving the original cell, corresponding to the predetermined MBMS.

In an exemplary embodiment, in a case that the UE is able to read, according to resource configuration information, which is acquired from an SIB of the original cell before leaving the original cell, corresponding to the predetermined MBMS, an MCCH and an MBMS channel, i.e. an MTCH corresponding to the resource configuration information, the UE sends the indication information to the network side.

In an exemplary embodiment, in a case that the UE is in an idle mode, that the UE sends the indication information to the network side may include that: the UE initiates setup of an RRC connection, and after the RRC connection is set up successfully, sends the indication information to the network side through a dedicated signaling; and in a case that the UE is in a connected mode, that the UE sends the indication information to the network side may include that: the UE sends the indication information to the network side through a dedicated signaling.

In an exemplary embodiment, the network side may be a base station, a core network element, or an application server, in a case that the network side is the core network element, that the UE sends the indication information to the network side may include that: the UE sends the indication information to a base station at the target cell, and the base station forwards the indication information to the core network element; and in a case that the network side is the application server, that the UE sends the indication information to the network side may include that: the UE sends the indication information to the base station at the target cell, the base station forwards the indication information to the core network element; and the core network element forwards the indication information to the application server providing the predetermined MBMS.

In an exemplary embodiment, after the UE sends the indication information to the network, the method may further include that: the network side sets up, for the UE, a bearer for transmitting the predetermined MBMS; and the UE continues or starts to receive the predetermined MBMS through the bearer that is set up.

In an exemplary embodiment, that the network side sets up, for the UE, the bearer for transmitting the predetermined MBMS may include that the network side receives the indication information sent by the UE and replies an acknowledgement message carrying configuration information of the bearer to the UE; and the UE receives the acknowledgement message replied by the network side, and sets up the bearer according to the configuration information of the bearer carried in the acknowledgement message.

In an exemplary embodiment, if the UE fails to receive, within a predetermined period of time after sending the indication information to the network side, the acknowledgement message replied by the network side, and the number of times that the UE sends the indication information to the network side has not reached a predetermined number of attempts, the UE may transmit the indication information to the network side again.

In an exemplary embodiment, the UE may send the indication information to the network side so as to trigger the network side to set up, for the UE, the bearer for transmitting the predetermined MBMS.

In an exemplary embodiment, the indication information may include at least one of the following contents: a flag for indicating that the UE has left the MBSFN area capable of carrying the predetermined MBMS; an ID of an MBSFN area capable of carrying the predetermined MBMS; a service ID of the predetermined MBMS; and a request for setup of a bearer for transmitting the predetermined MBMS.

A device for sending indication information is provided according to another aspect of the embodiments of the present disclosure, located in a UE. The device includes: a first determining component, configured to determine that the UE has left an MBSFN area capable of carrying a predetermined MBMS, wherein the predetermined MBMS is an MBMS that is being received or is prepared to be received before the UE leaves the MBSFN area; and an indicating component configured to, in a case that the first determining component determines that the UE has left the MBSFN area capable of carrying the predetermined MBMS, send indication information to a network side.

In an exemplary embodiment, the first determining component may be configured to: in a case that the UE, after leaving an original cell and resides in a target cell, fails to acquire resource configuration information corresponding to the predetermined MBMS from an SIB of the target cell, determine that the UE has left the MBSFN area capable of carrying the predetermined MBMS; or in a case that the UE detects that signal quality of the predetermined MBMS currently being received is lower than a signal quality threshold value, determine that the UE has left the MBSFN area capable of carrying the predetermined MBMS; or in a case that the UE detects that a bit error rate of decoding the predetermined MBMS currently being received is higher than a bit error rate threshold value, determine that the UE has left the MBSFN area capable of carrying the predetermined MBMS.

In an exemplary embodiment, the first determining component may be configured to determine, in the following conditions, that the UE fails to acquire the resource configuration information corresponding to the predetermined MBMS from the SIB of the target cell: configuration information of an MCCH fails to be acquired from the SIB of the target cell; or configuration information of an MCCH is acquired from the SIB of the target cell, but an MBSFN area corresponding to the MCCH in the SIB is not capable of carrying the predetermined MBMS.

In an exemplary embodiment, the device may further include: a first receiving component configured to, in a case that the first determining component determines that the UE fails to acquire the resource configuration information corresponding to the predetermined MBMS from the SIB of the target cell, continue or start to receive the predetermined MBMS in the target cell according to resource configuration information, which is acquired from an SIB of the original cell before leaving the original cell, corresponding to the predetermined MBMS.

In an exemplary embodiment, the indicating component may be configured to, in a case that the first determining component determines that the UE fails to acquire the resource configuration information corresponding to the predetermined MBMS from the SIB of the target cell, and the first receiving component is able to read a corresponding MCCH and a corresponding MTCH according to resource configuration information, which is acquired from an SIB of the original cell before leaving the original cell, corresponding to the predetermined MBMS, send the indication information to the network side.

In an exemplary embodiment, the first receiving component may be further configured to, after the network side sets up for the UE, a bearer for transmitting the predetermined MBMS, continue or start to receive the predetermined MBMS through the bearer that is set up.

In an exemplary embodiment, the indicating component may be configured to send the indication information to the network side so as to trigger the network side to set up, for the UE, the bearer for transmitting the predetermined MBMS.

In an exemplary embodiment, the indication information may include at least one of the following contents: a flag for indicating that the UE has left the MBSFN area capable of carrying the predetermined MBMS; an ID of an MBSFN area capable of carrying the predetermined MBMS; a service ID of the predetermined MBMS; and a request for setup of a bearer for transmitting the predetermined MBMS.

A UE is provided according to a third aspect of the embodiments of the present disclosure, including the device for sending the indication information as described above.

By means of the embodiments of the present disclosure, a UE sends indication information to a network side when determining that the UE has left an MBSFN area capable of carrying a predetermined MBMS, thus the technical problem in the related art that a network side usually fails to know that a UE moves to a cell unable to carry an MBMS, so that the network side cannot ensure service continuity and thus the reception of the MBMS by a user side is interrupted is solved. In this way, the network side can know in time that the UE has left the MBSFN area capable of carrying the predetermined MBMS that is being received or is prepared to be received, and the network side can take measures in time to ensure MBMS continuity.

BRIEF DESCRIPTION OF THE DRAWINGS

The accompanying drawings described herein are used for providing further understanding to the present disclosure and form a part of the present application. The schematic embodiments of the present disclosure and description thereof are used for explaining the present disclosure, instead of forming improper limitation to the present disclosure. In the accompanying drawings.

DETAILED DESCRIPTION OF THE EMBODIMENTS

The present disclosure will be expounded hereinafter with reference to the accompanying drawings and in conjunction with the embodiments. It needs to be noted that the embodiments in the present application and the characteristics in the embodiments may be combined with each other if there is no conflict.

Figure 1:
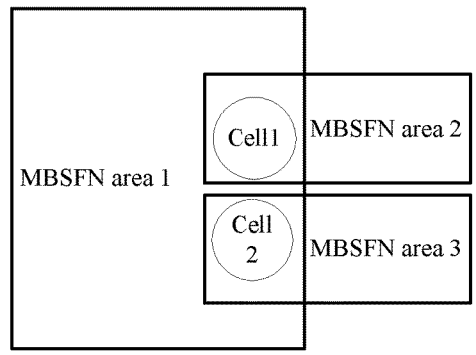
FIG. 1 is a schematic diagram of a state of a UE moving among a plurality of MBSFN areas according to the related art.
Figure 2:
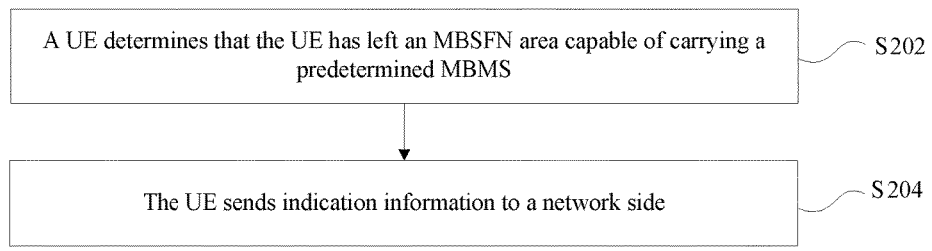
FIG. 2 is a flowchart of a method for sending indication information according to an embodiment of the present disclosure.

An embodiment of the present disclosure provides a method for sending indication information. FIG. 2 is a flowchart of a method for sending indication information according to an embodiment of the present disclosure. As shown in FIG. 2, the method includes the following steps.

Step S202: A UE determines that the UE has left an MBSFN area capable of carrying a predetermined MBMS, wherein the predetermined MBMS is an MBMS that is being received or is prepared to be received before the UE leaves the MBSFN area.

Step S204: The UE sends indication information to a network side.

By means of the method, the technical problem in the related art that a network side usually fails to know that a UE moves to a cell unable to carry an MBMS, so that the network side cannot ensure service continuity and thus the reception of the MBMS by a user side is interrupted is solved. In this way, the network side can know in time that the UE has left the MBSFN area capable of carrying the predetermined MBMS that is being received or is prepared to be received, and the network side can take measures in time to ensure MBMS continuity.

During a specific implementation process, the UE may determine that the UE has left the MBSFN area capable of carrying the predetermined MBMS by any one of the first method to the third method below.

(1) In a case that the UE, after leaving an original cell and resides in a target cell, fails to acquire resource configuration information corresponding to the predetermined MBMS from an SIB of the target cell, UE determines that the UE has left the MBSFN area capable of carrying the predetermined MBMS.

(2) In a case that the UE detects that signal quality of the predetermined MBMS currently being received is lower than a signal quality threshold value, the UE determines that the UE has left the MBSFN area capable of carrying the predetermined MBMS. In the present embodiment, if the UE believes that signal quality of the predetermined MBMS currently being received is poor, e.g. the signal quality is lower than a preset signal quality threshold value, the UE determines that the UE has left an MBSFN area corresponding to the MBMS, and sends the indication information to the network side.

(3) In a case that the UE detects that a bit error rate of decoding the predetermined MBMS currently being received is higher than a bit error rate threshold value, the UE determines that the UE has left the MBSFN area capable of carrying the predetermined MBMS. In the present embodiment, if the UE fails to well receive the MBMS, e.g. the UE fails to well decode a content in the MBMS, i.e. a bit error rate is extremely high, the UE determines that the UE has left an MBSFN area corresponding to the MBMS, and sends the indication information to the network side.

Figure 3:
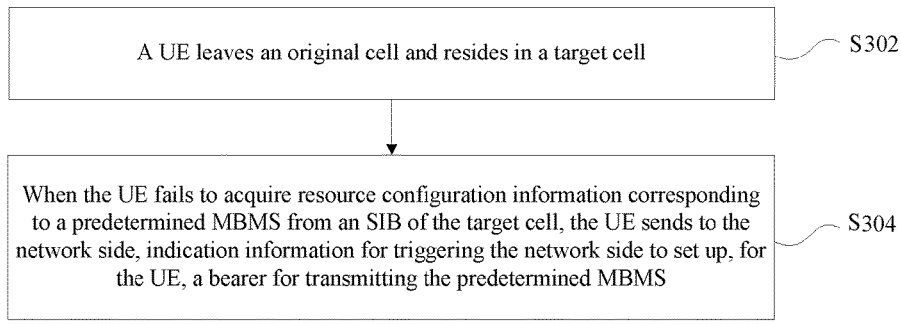
FIG. 3 is a flowchart of a method for sending indication information in a case that a UE leaves an MBSFN area capable of carrying a predetermined MBMS because the UE leaves an original cell and resides in a target cell according to an embodiment of the present disclosure.

An exemplary embodiment of the present disclosure provides a method for sending indication information in a case that a UE leaves an original cell, resides in a target cell, and fails to acquire resource configuration information corresponding to a predetermined MBMS from an SIB of the target cell, i.e. in a case that the UE leaves an MBSFN area capable of carrying the predetermined MBMS because the UE leaves the original cell and resides in the target cell. FIG. 3 is a flowchart of a method for sending indication information in a case that a UE leaves an MBSFN area capable of carrying a predetermined MBMS because the UE leaves an original cell and resides in a target cell according to an embodiment of the present disclosure. As shown in FIG. 3, the method includes the following steps.

Step S302: A UE leaves an original cell and resides in a target cell.

Step S304: When the UE fails to acquire resource configuration information corresponding to a predetermined MBMS from an SIB of the target cell, the UE sends indication information to a network side, wherein the predetermined MBMS is an MBMS that is being received or is prepared to be received in the original cell before the UE leaves the original cell.

It needs to be noted that the UE may be in a state of receiving the predetermined MBMS ("receiving the MBMS" as described in the background) or a state of preparing to receive the predetermined MBMS ("interested in receiving the MBMS" as described in the background), then the UE, after residing in the target cell from the original cell, may continue to receive the predetermined MBMS which is "being received" in the original cell, and may start receiving the predetermined MBMS that has not been received in the original cell, but is "of interest to be received". In other words, the predetermined MBMS may be an MBMS being received or an MBMS of interest to be received.

In the original cell, the UE may read an SIB of the cell to know an MBSFN area corresponding to the MBMS. In other words, the UE is in the MBSFN area in which the MBMS locates. At the moment, the UE may receive the predetermined MBMS in the original cell. After residing in the target cell, the UE fails to acquire a message related to the MBSFN area corresponding to the MBMS from the SIB of the target cell, and it may be learned that the UE is not in the MBSFN area corresponding to the MBMS. In other words, the UE is out of the MBSFN area where the MBMS locates. That is, the UE moves out of the MBSFN area corresponding to the MBMS.

In the method, if the UE fails to acquire the resource configuration information corresponding to the predetermined MBMS from the SIB of the target cell, e.g. the SIB of the target cell does not contain MCCH configuration information corresponding to an MBSFN to which the predetermined MBMS that the UE is interested in or receiving belongs, then the UE continues or starts to receive the predetermined MBMS in the target cell according to the resource configuration that is acquired from the SIB of the original cell before leaving the original cell and corresponds to the MBMS, and sends the indication information to the network side so as to trigger the network side to set up, for the UE, a bearer for transmitting the predetermined MBMS. A plurality of base stations working in the same frequency point is able to send MBMSs of the same content in an MBSFN area, thus resulting in macro diversity gain due to an addition effect. Therefore, although the target cell is not in the coverage of the MBSFN carrying the predetermined MBMS in the original cell, i.e. the original cell is in the MBSFN area while the target cell is out of the MBSFN area, signals of an MCCH and an MTCH of the MBSFN area may be still strong to go beyond the range of the original cell and extend to the range of the target cell because of the macro diversity gain of the MBSFN. In other words, the signals of the MCCH and the MTCH may be beyond the MBSFN area, and under the action of the macro diversity gain, the predetermined MBMS that is received or starts being received by the UE in the target cell may be from the addition effect of service signals in a plurality of cells in the MBSFN area. By means of this characteristic, the reception of the MBMS may be continued or the MBMS of interest may start to be received (corresponding to Step S204 that the UE receives the predetermined MBMS in the target cell) as much as possible by applying resource configuration of the original cell in a case that there is no MBSFN carrying the predetermined MBMS in the target cell, and the indication information is sent to trigger the network side to set up the new bearer for the UE, so that the UE maintains the MBMS continuity after residing in the target cell by a cell selection/ cell reselection process or a switching process, and before the new bearer is set up. Therefore, the technical problem in the related art that a network side usually fails to know that a UE moves to a cell unable to carry an MBMS, so that the network side cannot ensure service continuity and thus the reception of the MBMS by a user side is interrupted is solved. In this way, the network side can know in time that the UE has left the MBSFN area capable of carrying the predetermined MBMS that is being received or is prepared to be received, and the network side can take measures in time to ensure MBMS continuity.

The network side in the aforementioned embodiments of the present disclosure may be a base station (e.g. an evolved NodeB (eNB)), and may be also a core network element, and may be also an application server. When the network side refers to the core network element, the UE sends the indication information to the eNB in the target cell and the eNB forwards the indication information to the core network element. When the network side refers to the application server, a UE sends the indication information to the eNB in the target cell, the eNB forwards the indication information to the core network element, and the indication information is further forwarded to the application server that provides the predetermined MBMS so as to trigger the application server to set up, for the UE, the bearer for transmitting the predetermined MBMS. In the present disclosure, the UE sends the indication information to the network side. After receiving the indication information, a network element of the network side triggers setup of the new bearer for the UE so that the predetermined MBMS originally being received by the UE (or the predetermined MBMS that the UE prepares to receive) may be sent to the UE through the new bearer, so as to enable to UE to continue to receive the predetermined MBMS service on the new bearer set up by the network side for the UE.

Figure 4:
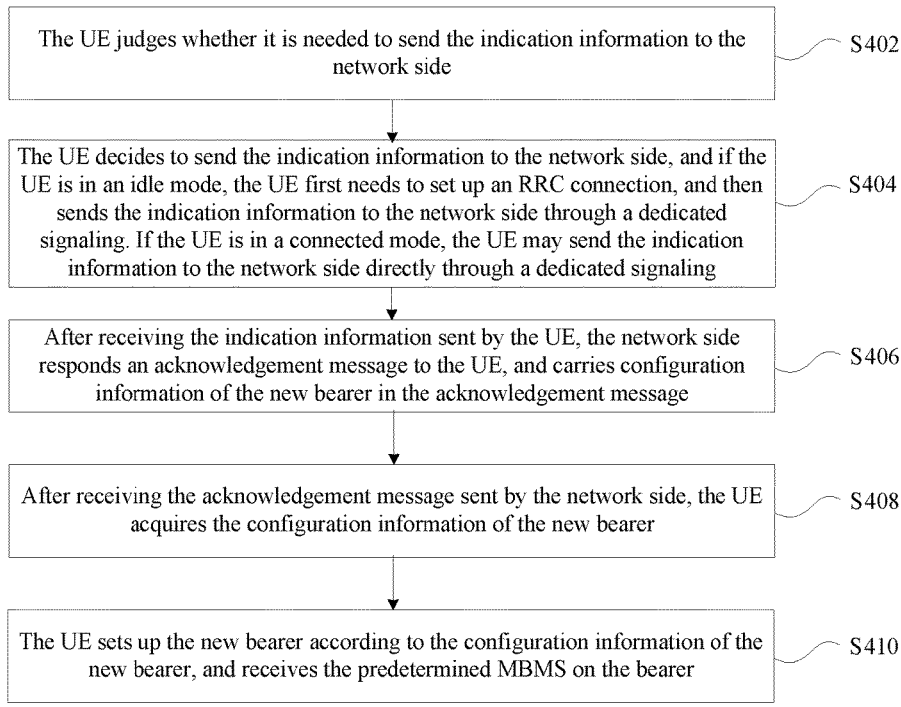
FIG. 4 is a detailed flowchart of a process in which a UE sends indication information to a network side to trigger the network side to set up, for the UE, a bearer for transmitting a predetermined MBMS according to an embodiment of the present disclosure.

FIG. 4 is a detailed flowchart of a process in which a UE sends indication information to a network side to trigger the network side to set up, for the UE, a bearer for transmitting a predetermined MBMS according to an embodiment of the present disclosure. As shown in FIG. 4, in an exemplary embodiment, in Step S304, the process in which the UE sends the indication information to the network side to trigger the network side to set up, for the UE, the bearer for transmitting the predetermined MBMS may further include several steps as follows.

Step S402: The UE judges whether it is needed to send the indication information to the network side.

Step S404: After the UE decides to send the indication information to the network side, and if the UE is in an idle mode, the UE first needs to set up an RRC connection, and then sends the indication information to the network side through a dedicated signaling. If the UE is in a connected mode, the UE may directly send the indication information to the network side through a dedicated signaling.

Step S406: After receiving the indication information sent by the UE, the network side responds an acknowledgement message to the UE, and carries configuration information of the new bearer in the acknowledgement message. The configuration information is used for notifying the UE to receive the MBMS on the new bearer.

Step S408: After receiving the acknowledgement message sent by the network side, the UE acquires the configuration information of the new bearer.

Step S410: The UE sets up the new bearer according to the configuration information of the new bearer, and receives the predetermined MBMS on the bearer.

In an exemplary embodiment, if the UE sends the indication information, but fails to receive the acknowledgement message of the network side within a predetermined period of time, the UE sends the indication information to the network side again. Besides, a predetermined number of attempts may be further preset in the UE, and if the total number of times that the UE sends the indication information reaches the predetermined number of attempts, the processing is terminated.

In practical application, Step S304 a situation that the UE fails to acquire the resource configuration information corresponding to the predetermined MBMS from the SIB of the target cell may include that:

the UE fails to acquire configuration information of an MCCH from the SIB of the target cell, e.g. the UE fails to acquire SIB 13 from the SIB of the target cell according to existing standards, i.e. no MBSFN area is configured on the target cell; or the UE acquires configuration information of an MCCH from the SIB of the target cell, but an MBSFN area corresponding to the MCCH in the SIB is not capable of carrying the predetermined MBMS. For example, the UE acquires SIB 13 from the SIB of the target cell according to existing standards, but an MBSFN area corresponding to an MCCH contained in SIB 13 is not capable of carrying the predetermined MBMS. Specifically, the SIB 13 does not contain the MBSFN area (i.e. the UE has left the MBSFN area) corresponding to the predetermined MBMS in the original cell, and there is no MBSFN area capable of carrying the predetermined MBMS among MBSFN areas corresponding to MCCHs contained in the SIB 13.

As an embodiment, in a case that the UE is able to read an MCCH and an MBMS channel, i.e. an MTCH corresponding to the resource configuration information according to resource configuration information, which is acquired from an SIB of the original cell before leaving the original cell, corresponding to the predetermined MBMS, the UE sends the indication information to the network side so as to trigger the network side to set up, for the UE, the bearer for transmitting the predetermined MBMS. The method can ensure the mobility of the predetermined MBMS to the largest extent. Of course, the UE may also send, in a case that the MCCH and the MBMS channel, i.e. the MTCH corresponding to the resource configuration information cannot be read according to the resource configuration information that is provided by the original cell and corresponds to the MBMS (a possible reason may be that the resource configuration information of the original cell has changed, or the UE is too far from the original MBSFN area), the indication information to the network side so as to trigger the network side to set up, for the UE, the bearer for transmitting the predetermined MBMS. The method can enable the UE to restore reception of the predetermined MBMS as fast as possible.

As an exemplary embodiment, after the network side sets up, for the UE, the bearer for transmitting the predetermined MBMS, the UE continues or starts to receive the predetermined MBMS through the bearer that is set up.

In the embodiments above, the indication information is sent by the UE to the network side so as to trigger the network side to set up, for the UE, the bearer for transmitting the predetermined MBMS. From the perspective of specific contents, the indication information may notify the network side that the UE has moved out of the MBSFN area corresponding to the predetermined MBMS, thereby triggering the network side to set up, for the UE, the bearer for transmitting the predetermined MBMS. It needs to be noted that, although the UE has left the area corresponding to the predetermined MBMS from the perspective of system configuration, the UE may still well receive the predetermined MBMS due to the effect of the macro diversity gain.

Based on the reasons above, while sending the indication information to trigger the network side to set up, for the UE, the bearer for transmitting the predetermined MBMS, the UE may try to continue to receiving or start receiving, with the help of properties of a macro diversity, the predetermined MBMS in the target cell according to resource configuration information, which is acquired from an SIB of the original cell before leaving the original cell, corresponding to the predetermined MBMS.

The indication information functions to trigger the network side to set up, for the UE, the bearer for transmitting the predetermined MBMS. However, from the perspective of a content carried by the indication information, the UE may send various types of indication information to the network side during practical application, so that the network side can set up the new bearer for the UE, so as to carry the predetermined MBMS. For example, the indication information may report at least one of the following content (1) to content (4) to the network side.

(1) A flag for indicating that the UE has left the MBSFN area capable of carrying the predetermined MBMS. At the moment, the network side may know, after acquiring the flag, that the UE has left the MBSFN area capable of carrying the predetermined MBMS, and that it is needed to set up the new bearer for the UE immediately so that the predetermined MBMS can be sent to the UE through the new bearer, thereby ensuring service continuity.

(2) An ID of an MBSFN area capable of carrying the predetermined MBMS. The indication information includes IDs of MBMS areas of the predetermined MBMS. The network side may know, according to the information, that the MBSFN area where the UE locates currently is not an MBSFN area corresponding to these IDs. In other words, the UE has left the MBSFN area capable of carrying the predetermined MBMS, and it is needed to set up the new bearer for the UE immediately so that the predetermined MBMS can be sent to the UE through the new bearer, thereby ensuring service continuity.

(3) Identification information of the predetermined MBMS. For example, the indication information includes: a service ID of the predetermined MBMS. At the moment, the network side may thereby know that the UE expects to continue or start to receive the predetermined MBMS. Since the network side knows MBSFN areas to which all MBMSs belong and MBSFN area configuration of all cells, the network side is able to know that the cell where the UE locates currently fails to provide the MBMS to the UE. Therefore, it is needed to consider setting up the new bearer for the UE, so that the predetermined MBMS can be sent to the UE through the new bearer, thereby ensuring service continuity.

(4) A request for setup of a bearer for transmitting the predetermined MBMS. For example, the indication information includes request information for requesting the network side to set up the bearer for the UE. At the moment, the network side may respond to the request so as to set up the bearer for the UE, so that the predetermined MBMS can be sent to the UE through the new bearer, thereby ensuring service continuity.

It needs to be noted that the UE may trigger, through various types of indication information, the network side to set up the new bearer for the UE, and the meanings of the indication information are not limited to several meanings listed above. As long as the UE and the network side are agreed on the indication information in advance, the UE is able to successfully trigger the network side to set up the new bearer for the UE in a case that an indication condition (e.g. the UE fails to acquire the resource configuration information corresponding to the predetermined MBMS from the SIB of the target cell) is satisfied. For example, the most convenient way is that the UE and the network side appoint a field, and appoint a meaning (e.g. 1 represents that the new bearer needs to be set up) of a value of the field.

Figure 5:
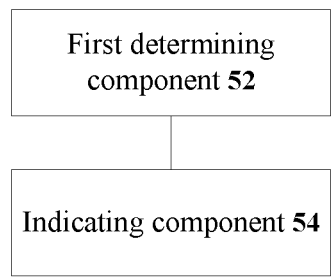
FIG. 5 is a structural block diagram of a device for sending indication information according to an embodiment of the present disclosure.

An embodiment of the present disclosure provides a device for sending indication information, located in a UE. FIG. 5 is a structural block diagram of a device for sending indication information according to an embodiment of the present disclosure. As shown in FIG. 5, the device includes:

a first determining component 52, configured to determine that the UE has left an MBSFN area capable of carrying a predetermined MBMS, wherein the predetermined MBMS is an MBMS that is being received or is prepared to be received before the UE leaves the MBSFN area; and an indicating component 54 connected to the first determining component 52 and configured to, in a case that the first determining component determines that the UE has left the MBSFN area capable of carrying the predetermined MBMS, send indication information to a network side.

In an exemplary embodiment, the first determining component 52 is configured to:

in a case that the UE, after leaving an original cell and resides in a target cell, fails to acquire resource configuration information corresponding to the predetermined MBMS from an SIB of the target cell, determine that the UE has left the MBSFN area capable of carrying the predetermined MBMS; or in a case that the UE detects that signal quality of the predetermined MBMS currently being received is lower than a signal quality threshold value, determine that the UE has left the MBSFN area capable of carrying the predetermined MBMS; or in a case that the UE detects that a bit error rate of decoding the predetermined MBMS currently being received is higher than a bit error rate threshold value, determine that the UE has left the MBSFN area capable of carrying the predetermined MBMS.

In practical application, the first determining component 52 is configured to determine, in the following conditions, that the UE fails to acquire the resource configuration information corresponding to the predetermined MBMS from the SIB of the target cell:

configuration information of an MCCH fails to be acquired from the SIB of the target cell, e.g. SIB 13 cannot be acquired from the SIB of the target cell according to existing standards, i.e. no MBSFN area is configured on the target cell; or configuration information of an MCCH is acquired from the SIB of the target cell, but an MBSFN area corresponding to the MCCH in the SIB is not capable of carrying the predetermined MBMS, e.g. SIB 13 cannot be acquired from the SIB of the target cell according to existing standards, i.e. no MBSFN area is configured on the target cell.

Figure 6:
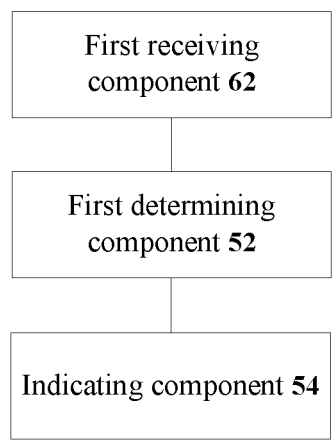
FIG. 6 is the first exemplary structural block diagram of a device for sending indication information according to an embodiment of the present disclosure.

FIG. 6 is the first exemplary structural block diagram of a device for sending indication information according to an embodiment of the present disclosure. As shown in FIG. 6, the device may further include: a first receiving component 62 configured to, in a case that the first determining component 52 determines that the UE fails to acquire the resource configuration information corresponding to the predetermined MBMS from the SIB of the target cell, continue or start to receive the predetermined MBMS in the target cell according to resource configuration information, which is acquired from an SIB of the original cell before leaving the original cell, corresponding to the predetermined MBMS.

In an exemplary embodiment, the indicating component 54 is configured to, when the first determining component 52 determines that the UE fails to acquire the resource configuration information corresponding to the predetermined MBMS from the SIB of the target cell, and the first receiving component 62 is able to read a corresponding MCCH and a corresponding MTCH according to resource configuration information, which is acquired from an SIB of the original cell before leaving the original cell, corresponding to the predetermined MBMS, send the indication information to the network side. The method can ensure the mobility of the predetermined MBMS to the largest extent. Of course, the indicating component 54 may also send, in a case that the MCCH and the MBMS channel, i.e. the MTCH corresponding to the resource configuration information cannot be acquired according to the resource configuration information that is provided by the original cell and corresponds to the MBMS (a possible reason may be that the resource configuration information of the original cell has changed, or the UE is too far from the original MBSFN area), the indication information to the network side so as to trigger the network side to set up, for the UE, the bearer for transmitting the predetermined MBMS. The method can enable the UE to restore reception of the predetermined MBMS as fast as possible.

In an exemplary embodiment, the first receiving component 62 is further configured to, after the network side sets up for the UE, a bearer for transmitting the predetermined MBMS, continue or start to receive the predetermined MBMS through the bearer that is set up. By means of the method above, the UE can continue to receive the MBMS, thereby ensuring the MBMS continuity.

The indicating component 54 is configured to send the indication information to the network side so as to trigger the network side to set up, for the UE, the bearer for transmitting the predetermined MBMS.

The indication information functions to trigger the network side to set up, for the UE, the bearer for transmitting the predetermined MBMS. However, from the perspective of a content carried by the indication information, the UE may send various types of indication information to the network side during practical application, so that the network side can set up the new bearer for the UE, so as to carry the predetermined MBMS. For example, the indication information may report at least one of the following content (1) to content (4) to the network side.

(1) A flag for indicating that the UE has left the MBSFN area capable of carrying the predetermined MBMS. At the moment, the network side may know, after acquiring the flag, that the UE has left the MBSFN area capable of carrying the predetermined MBMS, and that it is needed to set up the new bearer for the UE immediately so that the predetermined MBMS can be sent to the UE through the new bearer, thereby ensuring service continuity.

(2) An ID of an MBSFN area capable of carrying the predetermined MBMS. The indication information includes IDs of MBMS areas of the predetermined MBMS. The network side may know, according to the information, that the MBSFN area where the UE locates currently is not an MBSFN area corresponding to these IDs. In other words, the UE has left the MBSFN area capable of carrying the predetermined MBMS, and it is needed to set up the new bearer for the UE immediately so that the predetermined MBMS can be sent to the UE through the new bearer, thereby ensuring service continuity.

(3) Identification information of the predetermined MBMS. For example, the indication information includes: a service ID of the predetermined MBMS. At the moment, the network side may thereby know that the UE expects to continue or start to receive the predetermined MBMS. Since the network side knows MBSFN areas to which all MBMSs belong and MBSFN area configuration of all cells, the network side is able to know that the cell where the UE locates currently fails to provide the MBMS to the UE. Therefore, it is needed to consider setting up the new bearer for the UE, so that the predetermined MBMS can be sent to the UE through the new bearer, thereby ensuring service continuity.

(4) A request for setup of a bearer for transmitting the predetermined MBMS. For example, the indication information includes request information for requesting the network side to set up the bearer for the UE. At the moment, the network side may respond to the request so as to set up the bearer for the UE, so that the predetermined MBMS can be sent to the UE through the new bearer, thereby ensuring service continuity.

It needs to be noted that the indicating component 54 may trigger, through various types of indication information, the network side to set up the new bearer for the UE, and the meanings of the indication information are not limited to several meanings listed above. As long as the indicating component 54 and the network side are agreed on the indication information in advance the indicating component 54 is able to successfully trigger the network side to set up the new bearer for the UE in a case that an indication condition (e.g. the UE fails to acquire the resource configuration information corresponding to the predetermined MBMS from the SIB of the target cell) is satisfied. For example, the most convenient way is that the indicating component 54 and the network side appoint a field, and appoint a meaning (e.g. 1 represents that the new bearer needs to be set up) of a value of the field.

In a case that the UE where the device locates is in an idle mode, the indicating component 54 may initiate setup of an RRC connection, and after the RRC connection is set up successfully, send the indication information to the network side through a dedicated signaling.

In a case that the UE where the device locates is in a connected node, the indicating component 54 may send the indication information to the network side through a dedicated signaling.

The network side is a base station, a core network element, or an application server. In a case that the network side is the core network element, the indicating component 54 is configured to send the indication information to a base station at the target cell, so as to trigger the base station to forward the indication information to the core network element; and in a case that the network side is the application server, the indicating component 54 is configured to send the indication information to the base station at the target cell so as to trigger the base station to forward the indication information to the core network element; and the core network element forwards the indication information to the application server.

Figure 7:
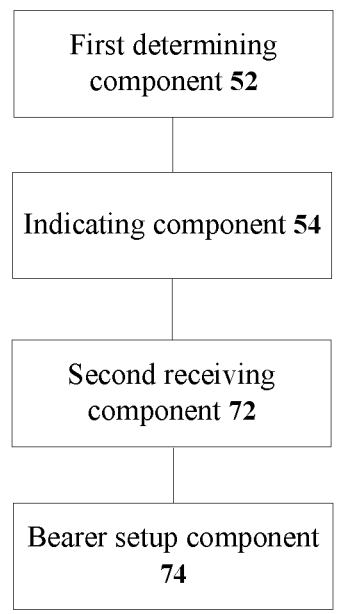
FIG. 7 is the second exemplary structural block diagram of a device for sending indication information according to an embodiment of the present disclosure.

FIG. 7 is the second exemplary structural block diagram of a device for sending indication information according to an embodiment of the present disclosure. As shown in FIG. 7, the device further includes: a second receiving component 72, configured to receive an acknowledgement message which is replied by the network side in response to the indication information and carries configuration information of the bearer; and a bearer setup component 74, connected to the second receiving component 72 and configured to set up the bearer according to the bearer configuration information carried in the acknowledgement message.

Figure 8:
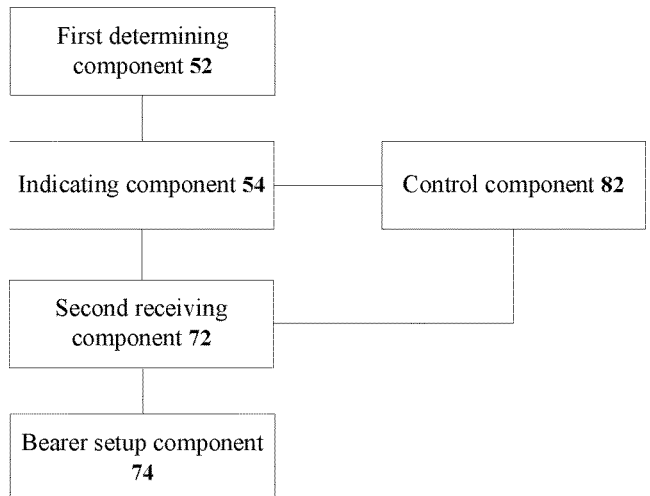
FIG. 8 is the third exemplary structural block diagram of a device for sending indication information according to an embodiment of the present disclosure.

FIG. 8 is the third exemplary structural block diagram of a device for sending indication information according to an embodiment of the present disclosure. As shown in FIG. 8, the device further includes: a control component 42, connected to the indicating component 54 and the second receiving component 72, and configured to, in a case that the second receiving component 72 fails to receive, within a predetermined period of time after the indicating component 54 sends the indication information to the network side, the acknowledgement message replied by the network side, and the number of times that the indicating component 54 sends the indication information to the network side has not reached a predetermined number of attempts, schedule the indicating component 54 to send the indication information to the network side again.

An embodiment of the present disclosure further provides a UE. The UE may include the device for sending the indication information, and an internal structure and functions of all parts of the UE are described above and will not be repeated here.

Figure 9:
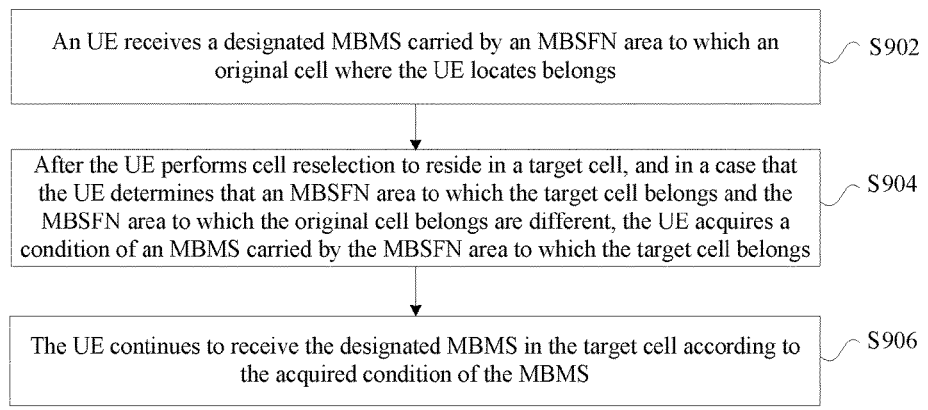
FIG. 9 is a flowchart of a method for receiving an MBMS according to an embodiment of the present disclosure.

An embodiment of the present disclosure further provides a solution of ensuring the continuity of an MBMS in various scenarios after a UE is reselected from an original cell to a target cell. FIG. 9 is a flowchart of a method for receiving an MBMS according to an embodiment of the present disclosure. As shown in FIG. 9, the method includes the following steps.

Step S902: An UE receives a designated MBMS carried by an MBSFN area to which an original cell where the UE locates belongs.

Step S904: After the UE performs cell reselection to reside in a target cell, and in a case that the UE determines that an MBSFN area to which the target cell belongs and the MBSFN area to which the original cell belongs are different, the UE acquires a condition of an MBMS carried by the MBSFN area to which the target cell belongs.

Step S906: The UE continues to receive the designated MBMS in the target cell according to the acquired condition of the MBMS.

By means of the processing steps above, in a case that the UE determines that the MBSFN area to which the target cell belongs and the MBSFN area to which the original cell belongs are different, the UE continues to receive the designated MBMS according to the acquired condition of the MBMS carried by the MBSFN area to which the target cell belongs, thus solving the problem that there is no solution for the UE to receive the same service continuously when moving between cells among different MBSFN cells, further solving the problem that the same service cannot be received continuously when the UE moves between different cells, so that the UE can still receive the same service continuously when moving out of a current MBSFN area.

Step S902 may manifest as the following implementation form during specific implementation: when the UE starts to receive an MBMS (i.e. the designated MBMS) that the UE is interested in, the UE may know that the MBMS that the UE is interested in is carried on one or more MBSFN areas on a current cell. The UE reads (i.e. receives) the same MBMS that the UE is interested in and that is carried by the one or more MBSFN areas.

Accordingly, Step S904 and Step S906 may manifest as the following implementation processes during specific implementation: after the UE moves to reside in a target cell, and if the target cell does not carry the MBMS that the UE is interested in, the UE applies a related configuration parameter provided by the original cell to try to read the MBMS that the UE is received originally and is interested in, so as the ensure the continuity of the service. After moving to a target cell, the UE may know that the MBMS that the UE is interested in is carried on one or more MBSFN areas on the current cell if the target cell carries the MBMS that the UE is interested in. The UE reads the same MBMS that the UE is interested in and that is carried by the one or more MBSFN areas. When the UE is able to read the MBMS that the UE is interested from a plurality of MBSFN areas, the UE is able to select one of the MBSFN areas to read the MBMS that the UE is interested in. The UE may also combine MBMS contents acquired from the plurality of MBSFN areas, so as to improve reception gain. A combining method may be soft combination or selective combination, and may be a combination of a plurality of combining methods.

The UE continues to receive the designated MBMS by applying different receiving methods according to different MBMS conditions above, which may specifically include, but is not limited to several conditions as follows.

(1) When the condition of the MBMS indicates that the designated MBMS is not carried by all MBSFN areas to which the target cell belongs, the UE continues to receive the designated MBMS according to a configuration parameter provided by the original cell.

(2) When the condition of the MBMS indicates that the designated MBMS is carried by a part of MBSFN areas to which the target cell belongs, the UE selects one or more MBSFN areas from the part of MBSFN areas according to a predetermined strategy, so as to continue to receive the designated MBMS.

(3) The part of MBSFN areas may include the MBSFN area to which the original cell belongs, and may also include an MBSFN area different from the MBSFN area to which the original cell belongs. In the former condition, the UE preferentially selects the MBSFN area to which the original cell belongs from the part of MBSFN areas so as to continue to receive the designated MBMS, but is not limited thereto. For example, the UE may also randomly select one or more MBSFN areas from the some areas so as to continue to receive the designated MBMS.

After the UE selects a plurality of MBSFN areas from the same MBSFN areas to continue to receive the designated MBMS, the UE combines the designated MBMSs received by the plurality of selected MBSFN areas, thereby improving the reception gain of the designated service.

The predetermined strategy includes, but is not limited to one of the followings: one or more MBSFN areas are selected randomly from a part of MBSFN areas; and one or more MBSFN areas are selected according to the signal quality of MBMSs carried by all MBSFN areas among a part of MBSFN areas.

The original cell may belong to a plurality of MBSFN areas during practical application. In this case, the UE may select one or more MBSFN areas from the plurality of MBSFN areas to which the original cell belongs, so as to receive the designated MBMS.

Figure 10:
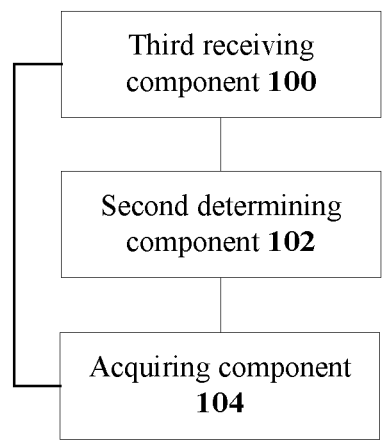
FIG. 10 is a structural block diagram of a device for receiving an MBMS according to an embodiment of the present disclosure.

The present embodiment further provides a device for receiving an MBMS. The device is located in a UE and configured to implement the embodiments and exemplary embodiments above, and what has been described will not be repeated. Components involved in the device will be described below. As used below, the term "component" may implement a combination of software and/or hardware having a predetermined function. Although the device described in the following embodiment is preferably implemented by software, implementation using hardware, and a combination of software and hardware is also possible and conceivable. FIG. 10 is a structural block diagram of a device for receiving an MBMS according to an embodiment of the present disclosure. As shown in FIG. 10, the device includes:

a third receiving component 100, connected to a second determining component 102 and an acquiring component 104 and configured to receive a designated MBMS carried by an MBSFN area to which an original cell where the device currently locates belongs, and continue to receive the designated MBMS according to an MBMS condition which is acquired by the acquiring component 104 and carried by an MBSFN area to which a target cell belongs, wherein the target cell is a cell where the UE resides after cell reselection;

a second determining component 102, connected to the acquiring component 104 and configured to, after the UE resides in the target cell after cell reselection, determine that the MBSFN area to which the target cell belongs and the MBSFN area to which the original cell belongs are different;

the acquiring component 104 configured to, in a case that the second determining component 102 determines that the MBSFN area to which the target cell belongs and the MBSFN area to which the original cell belongs are different, acquire the MBMS carried by the MBSFN area to which the target cell belongs.

Functions implemented by the components above enable the UE to, in a case that it is determined that the MBSFN area to which the target cell belongs and the MBSFN area to which the original cell belongs are different, continue to receive the designated MBMS service according to the MBMS condition carried by the MBSFN area to which the target cell belongs, thus solving the problem that there is no solution for the UE to receive the same service continuously when moving between cells among different MBSFN cells, further solving the problem that the same service cannot be received continuously when the UE moves between different cells, so that the UE can still receive the same service continuously when moving out of a current MBSFN area.

In an exemplary embodiment, the third receiving component 100 is further configured to, in a case that the MBMS condition indicates that the designated MBMS is not carried by all MBSFN areas to which the target cell belong, continue to receive the designated MBMS according to a configuration parameter provided by the original cell.

In an exemplary embodiment of the present disclosure, the third receiving component 100 is further configured to, in a case that the MBMS condition indicates that a part of MBSFN areas to which the target cell belongs carry the designated MBMS, select one or more MBSFN areas from the part of MBSFN areas according to a predetermined strategy to continue to receive the designated MBMS.

The third receiving component 100 is further configured to, in a case that the original cell belong to a plurality of MBSFN areas, select one or more MBSFN areas from the plurality of MBSFN areas to which the original cell belongs, so as to receive the designated MBMS.

Specific description will be provided below in combination with specific embodiments and related accompanying drawings so as to better understand the embodiments above. The major design idea of the following embodiments is that:

When a UE starts attempting to receive an MBMS that the UE is interested in, and if the UE fails to receive the MBMS of interest in on a current cell where the UE resides, such a scenario is not a research content of the following embodiments. In other words, an application scenario of the following embodiments is that: it is assumed that a UE is always able to start receiving an MBMS of interest in at least one among one or more MBSFN areas to which the current cell belongs. When the UE starts to receive the MBMS of interest in the current cell, the MBMS of interest may be received on one or more MBSFNs, and a method for the UE to start receiving the service in an original cell is illustrated in the first embodiment.

When the UE moves to a target cell, and after the UE resides in the target cell through cell reselection, the UE continues to receive the service in the target cell according to a method in the second embodiment so as to continue to receive the MBMS that the UE is interested in ant that is carried on a certain/some MBSFNs of the original cell. To facilitate description, the present disclosure illustrates an example that the service can be received on only one MBSFN of the current cell when the UE starts to receive the MBMS that the UE is interested in.

Embodiment 1

The present embodiment provides a method for a UE to start receiving an MBMS that the UE is interested in, and further provides a method for a UE to combine the same MBMS content of a plurality of MBSFN areas.

In the present embodiment, the UE has known, in advance, a TMGI of the MBMS that the UE is interested in. The UE resides in a certain cell, and starts to receive the MBMS that the UE is interested in. In the present embodiment, it is provided that the cell belongs to one or more MBSFN (overlapped) areas, and the UE may read the MBMS that the UE is interested in from at least one MBSFN area.

If the UE is able to receive the MBMS that the UE is interested in on a plurality of MBSFN areas, the UE can select one of the MBSFN areas, and may also select a plurality of MBSFN areas among them, so as to receive the MBMS that the UE is interested in on this/these MBSFN areas.

If the UE selects one of the MBSFN areas to receive the MBMS that the UE is interested in, the UE may randomly select one MBSFN area from these MBSFN areas, and may also select one MBSFN area according to the MBMS signal strength and signal quality on these MBSFN areas. The UE selects a plurality of MBSFN areas, and a receiving method on these MBSFN areas is the same as that on one MBSFN area.

In a word, when the UE resides in a cell belonging to one or more MBSFN area, and starts to receive an MBMS that the UE is interested in, if the UE can receive the MBMS that the UE is interested in on a plurality of MBSFN areas simultaneously, then 1) the UE can select one of the MBSFN areas to receive the MBMS that the UE is interested in; the UE may randomly select one MBSFN area therefrom, and may also select one MBSFN area according to the MBMS signal strength and signal quality on these MBSFN areas, and then the UE receives the MBMS that the UE is interested in on the MBSFN area;

2) the UE selects a plurality of MBSFN areas therefrom to receive the MBMS that the UE is interested in; the UE may randomly select the plurality of MBSFN areas, and may also select the plurality of MBSFN areas according to the MBMS signal strength and signal quality on these MBSFN areas, and then the UE receives the MBMS that the UE is interested in on these MBSFN areas; when the UE can read the MBMS that the UE is interested on the plurality of MBSFN areas, the UE can combine MBMS contents acquired on the plurality of different MBSFN areas so as to improve reception gain; a combining method may be soft combination, or selective combination, and may be also a combination of a plurality of combining methods.

Embodiment 2

Figure 11:
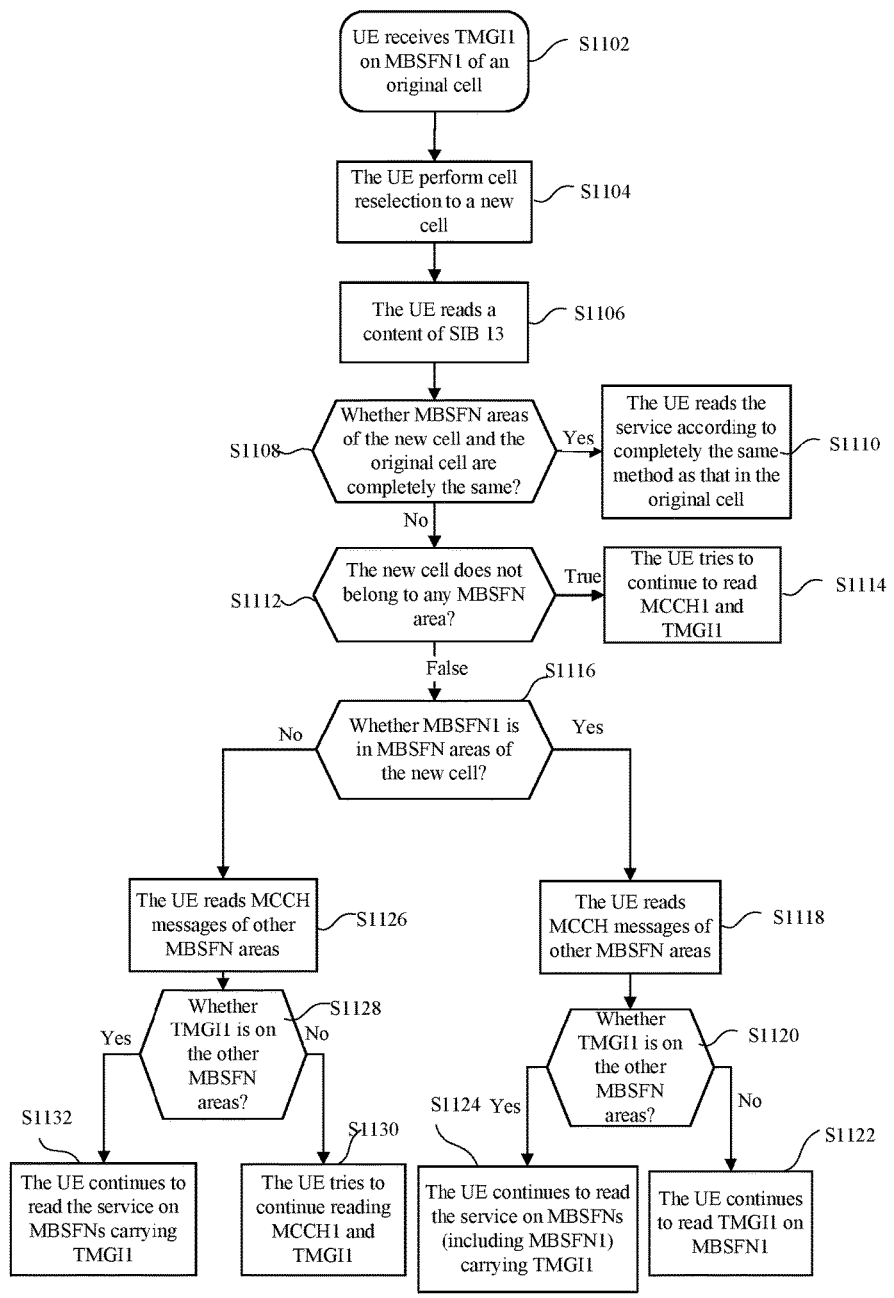
FIG. 11 is a flowchart of continuing to read an MBMS by a UE in a target cell according to an embodiment of the present disclosure.

The present embodiment provides a method (as shown in FIG. 11) for a UE that is receiving an MBMS of interest in a certain cell (an original cell) to reside in a target cell through cell reselection and continue to receive the MBMS. The present embodiment further provides a method for a UE to combine the same MBMS content of a plurality of MBSFN areas.

The present embodiment applies the following technical solution so as to achieve the purpose above.

Step S1102: An UE receives a service TMGI1 on MBSFN1 of an original cell.

Step S1104: The UE is reselected to a target cell.

Step S1106: The UE reads an SIB 13 message of the current target cell.

Step S1108: Whether an MBSFN area to which the target cell belongs and an MBSFN area to which the original cell belongs are completely the same is compared, if so, Step S1110 is performed, and otherwise, Step S1112 is performed.

Step S1110: If the original cell and the target cell belong to completely the same MBSFN overlapped area, the UE reads an MBMS of interest according to completely the same method as that used in the original cell. That is, the UE still reads the MBMS that the UE is interested in on an MTCH of one or more identical MBSFN areas, and the flow is terminated here.

Step S1112: If the original cell and the target cell belong to MBSFN overlapped areas which are not completely the same, whether an SIB 13 area is not configured in the target cell is judged. In other words, whether the target cell does not belong to any MBSFN area is judged, and if so, Step S1114 is performed. Otherwise, Step S1116 is performed.

Step S1114: If an SIB 13 message is not configured on the target cell, the UE moves out of all MBSFN areas, and the UE tries to continue reading an MCCH message and the MBMS that the UE is interested in on an MCCH configuration resource indicated by the original cell, and the flow is terminated here.

Step S1116: If the SIB 13 message indicates one or more MBSFN (overlapped) areas to which the cell belongs, it is judged whether the one or more MBSFN (overlapped) areas to which the cell belongs include an MBSFN area carrying the MBMS that is currently received is indicated. If yes, Step S1118 is performed. Otherwise, Step S1126 is performed.

Step S1118: The UE needs to further read an MCCH message of another area and Step S1120 is performed.

Step S1120: Whether a new MBSFN area carries the MBMS originally being read is judged. That is, whether there is TMGI1 on another MBSFN is judged. If yes, Step S1124 is performed. Otherwise, Step S1122 is performed.

Step S1122: If the MBMS originally being received is not carried on all MBSFN areas of the target cell, the UE tries to continue reading the MCCH message or the MBMS that the UE is interested in on the MCCH configuration resource indicated by the original cell.

Step S1124: If one or more MBSFN areas among all MBSFN areas of the target cell carry the MBMS originally being received, then the UE may read, on at least one MBSFN area among this/these MBSFN areas, the MBMS originally being received.

When a plurality of MBSFN areas of the target cell carry the MBMS originally being received, the UE may select one MBSFN area, and may also choose to receive the MBMS that is carried on a plurality of MBSFN areas and is originally being received by the UE.

A method for the UE to select one MBSFN area from the plurality of MBSFN area to receive the MBMS may include that the UE randomly selects one MBSFN, and may also include that the UE selects one MBSFN area according to the MBMS signal strength and signal quality on these MBSFN areas, and the UE selects a plurality of MBSFN areas according to similar methods.

In the meanwhile, the UE may also try to continue reading the MCCH message and the MBMS that the UE is interested in on the MCCH configuration resource indicated by the original cell.

If it is indicated in the SIB 13 message on the target cell that one or more MBSFN (overlapped) areas to which the cell belongs include an MBSFN area carrying the MBMS that is currently received, the UE is not only able to continue receiving the MBMS on the original MBSFN area, but also read an MCCH message of another area, so as to determine whether the new MBSFN area carries the MBMS that is originally being received. Therefore, the following step is included.

If the MBMS that is originally being received is not carried on all MBSFN areas of the target cell, the UE continues to receive the MBMS on the original MBSFN area.

If all MBSFN areas of the target cell include the same MBSFN as that of the original cell, and one or more other MBSFN areas carry the MBMS that is originally being received, the UE can read, on at least one MBSFN area in this/these MBSFN areas, the MBMS that is originally being received.

When a plurality of MBSFN areas (including the same MBSFN as that of the original cell) in the target cell carry the MBMS that is originally being received, the UE can select one of the MBSFN areas, and may also select a plurality of MBSFN areas therein, and receives, on this/these MBSFN areas, the MBMS that is originally being received.

If one of the MBSFN areas is selected to receive the MBMS that is originally being received by the UE, generally, for simplicity's sake, the UE will receive, on the MBSFN area that is the same as that of the original cell, the MBMS that is originally being received. However, a method for the UE to select one MBSFN area from the plurality of MBSFN areas (including the original MBSFN area) to receive the MBMS is also allowed. Further, the UE may randomly select one MBSFN, and may also select one MBSFN according to the MBMS signal strength and quality on these MBSFN areas.

The UE may also select a plurality of MBSFN areas therein, and receives the MBMS on these MBSFN areas, and a method includes that the UE selects a plurality of MBSFN areas to receive the MBMS that the UE is interested in. The UE may randomly select the plurality of MBSFN areas, and may also select the plurality of MBSFN areas according to the MBMS signal strength and signal quality on these MBSFN areas. Subsequently, the UE receives the MBMS that the UE is interested in on these MBSFN areas. When the US can read the MBMS that the UE is interested in on the plurality of MBSFN areas, the UE may combine MBMS contents acquired from the plurality of different MBSFN areas, so as to improve reception gain. A combining method may be soft combination, or selective combination, and may be also a combination of a plurality of combining methods.

In the present embodiment, to facilitate description of a specific embodiment, a UE has in advance known a TMGI of an MBMS that the UE is interested in, and it is set that the TMGI is TMGI1. The UE resides in a certain cell (provided that it is an original cell 1), finds and reads a content of TMGI1 (the MBMS that the UE is interested in). Specifically, 1) the UE has in advance known that the MBMS that the UE is interested in is identified as TMGI1; 2) the UE first reads SIB 13; 3) then the UE finds configuration information of several MCCHs and reads these MCCHs to find that TMGI1 is carried on MBSFN1 corresponding to MCCH1; 4) subsequently, the UE reads a content of TMGI1 on an MTCH, and at the moment, the UE still monitors SIB 13 and reads a content of MCCH1.

When the UE is reselected to a target cell (provided that the target cell is cell 2) from the original cell (cell 1), the UE reads SIB 13 in cell 2, and acquires a certain MCCH/some MCCHs configured on cell 2, thereby knowing MBSFN areas to which cell 2 belongs. There will be 3 results as follows.

There may be no SIB 13 in the cell 2, and the cell does not belong to any MBSFN area at the moment.

Although the cell has SIB 13, but does not have configuration information of MCCH1, and the cell does not belong to an area covered by MBSFN1.

The cell has SIB13 and configuration information of MCCH1.

The 3 results above and methods for the UE to maintain service continuity will be introduced in details in the following third, fourth and fifth embodiments.

Step S1126: The UE reads an MCCH message of another MBSFN area, and Step S428 is performed.

Step S1128: Whether TGMI1 is on said another MBSFN area is judged. If yes, Step S1132 is performed. Otherwise, Step S1130 is performed.

Step S1130: The UE tries to continue reading MCCH1 and TMGI1.

Step S1132: The UE continues to read the service on an MBSFN carrying TMGI1.

Embodiment 3

Figure 12:
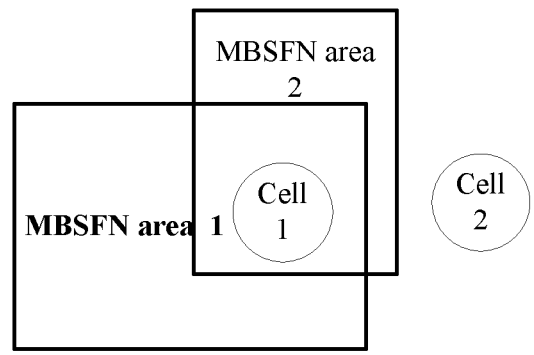
FIG. 12 is a schematic diagram of moving a UE out of an MBSFN area according to an embodiment of the present disclosure.

If Result 1) in the second embodiment occurs, that is, the cell 2 does not have SIB 13, and the cell does not belong to any MBSFN area at the moment, in other words, the UE moves out of MBSFN (including MBSFN1) coverage, in this case, the UE, which fails to read SIB 13 of cell 2, also fails to read configuration information of any MCCH (including MCCH1), specifically as shown in FIG. 12.

The present embodiment illustrates a scenario in which the UE moves out of MBSFN coverage. At the moment, the UE resides in the target cell 2 from the original cell 1 through cell reselection. The UE fails to read SIB 13, and also fails to read configuration information of any MCCH. According to the fact whether the UE can continue to read MCCH1 and MTCH1 (although the UE cannot read SIB 13 to acquire configuration information of an MCCH, the UE may still read contents of MCCH1 and MTCH1 according to original configuration), the present embodiment is further divided into 2 scenarios.

1-1) The UE may read the contents of MCCH1 and MTCH1 in cell 2.

1-2) The UE fails to read the contents of MCCH1 and MTCH1 in cell 2.

If Result 1-1) occurs, it is because the gain of an MBSFN macro diversity of MBSFN1, and signals of MCCH1 of MBSFN1 and MTCH1 are strong to go beyond the coverage of cell 1 and extend to the coverage of cell 2, though cell 2 is not in MBSFN1 coverage. It also required that a configuration parameter of MCCH1 is not changed according to this result (i.e. a configuration parameter about MCCH1 on SIB 13 is not changed). Since the UE can read MCCH1 correctly, the UE is able to read MTCH1, and read the content of TMGI1 correctly, indicated by that the service is still continuous.

If Result 1-2) occurs, since the UE fails to read MCCH1 correctly, thus failing to read the content of TMGI1, indicated by interruption of the service. Such a result is caused because the UE is far from the MBSFN1 coverage, and fails to read and correctly receive the content of MCCH1, thus the UE fails to read MTCH1 (fails to read TMGI1). Another possible reason is that the configuration parameter of MCCH1 changes. Since the UE fails to read the configuration information of MCCH1 in SIB 13 on cell 1, the UE fails to know a new configuration parameter of MCCH1, thus the UE fails to read the content of MCCH1, and thus failing to read the contents of MTCH1/TMGI1.

Figure 13:
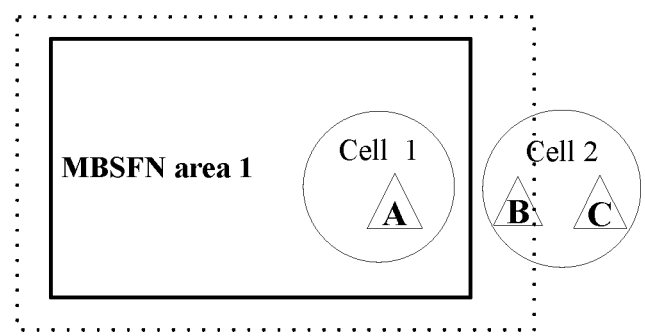
FIG. 13 is a schematic diagram of trying to continue to receive a service by a UE in a non-MBSFN area according to an embodiment of the present disclosure.

As the UE moves from cell 1 and performs cell reselection to cell 2, and in a case that it is assumed that the configuration parameter of MCCH1 is not changed (generally, configuration information of an MCCH in SIB 13 will not change), moves from cell 1 to cell 2, and moves from a boundary area of cell 2 to a central area of cell 2, i.e. the UE moves from point A of cell 1 in FIG. 13 to point B (reselected to cell 2) first, and then moves to point C (from the boundary of cell B to the center), 1-1) will occur and then 1-2), generally. During this process, the UE tries to read MCCH1 and MTCH1, so as to continue read the service that the UE is interested in, thereby ensuring continuity of the service.

After the UE leaves the original cell and is reselected to the target cell, when the UE-read SIB on the target cell does not include the configuration parameter of MCCH1 (i.e. MCCH configuration information corresponding to the MBSFN area to which the MBMS that the UE is interested in or that is currently received by the UE belongs), and the UE can still read the contents of MCCH1 and MTCH1 (i.e. the UE can still continue to read the original MCCH and MTCH in the target cell), the UE sends indication information to a network at the moment to notify the network side that the UE has moved out of a certain/some MBSFN areas, and/or notify the network side of a certain/some services that the UE is interested in or receiving.

Thus, the network side is able to know that the UE has moved out of the MBSFN area, and/or that the UE will fail to continue to acquire a certain/some services that the UE is interested in or receiving, and it is needed set up a new bearer for the UE, so that the service can be sent to the UE by the new bearer, thereby ensuring the continuity of the service.

In a word, after the UE that is interested in or receiving a certain/some MBMSs is reselected to the target cell, if the MCCH configuration information corresponding to the service cannot be read on a system broadcast cell of the target cell, the UE tries to read the MCCH and MTCH corresponding to the service on one hand, and on the other hand, notifies the network side that the UE cannot acquire the service any more. After receiving notification information sent by the UE, the network side sets up the new bearer for the UE as fast as possible, so that the service can be sent to the UE through the new bearer, thereby ensuring the continuity of the service.

The UE side may implement the functions above through the following components.

A receiving component, configured to receive the SIB of the target cell, and continue to receive the MBMS deployed on the original MBSFN.

A judging component configured to, in a case that the received SIB on the target cell does not include the configuration parameter of the original MBSFN area, judge that the UE has moved out of the original MBSFN area.

An indicating component, configured to notify the network side that the UE has left the original MBSFN area, and/or notify the network side that the UE expects to continue receiving the MBMS service, and/or notify the network side that the UE expects to set up the new bearer with the network side.

Through the processing above, after leaving the original MBSFN area, the UE may utilize the characteristic that MCCH and MTCH signals sent by an MBSFN mode are strong to continue to receive the original service out of the original MSBFN area. Besides, the UE continues to receive the original service out of the original MBSFN area on one hand, and on the other hand, notifies the network side to set up the new bearer, so as to ensure the service continuity to the largest extent.

Embodiment 4

Figure 14:
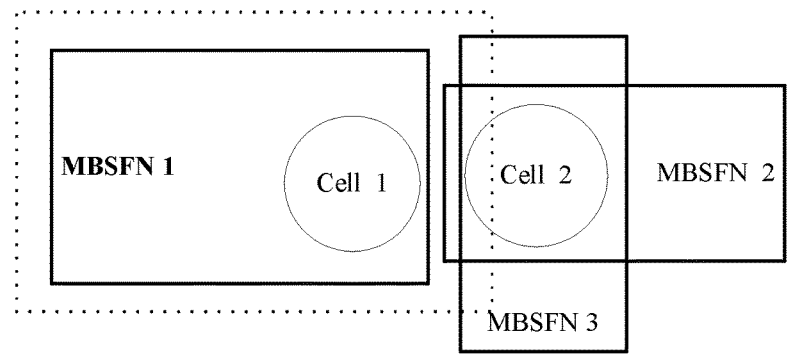
FIG. 14 is a schematic diagram illustrating that a UE continues to receive a service after moving out of an original MBSFN area and enters a new MBSFN area according to an embodiment of the present disclosure.

If Result 2) occurs, the cell has SIB 13, but does not have the configuration information of MCCH1, thus the cell is not in MBSFN1 coverage, and the UE still fails to acquire the configuration information of MCCH1 by reading SIB 13. However, the UE can read SIB 13 to acquire configuration information of other MCCHs, specifically as shown in FIG. 14.

For MBSFN1, the scenario of the present embodiment is also a scenario in which the UE has moved out of the MBSFN area. What is different from the second embodiment is that the UE can read related information of other MBSFN areas in cell 2. The UE moves out of MBSFN1 while entering other MBSFN areas. At the moment, the UE receives and processes MCCH1 according to the same methods in the result scenario 1) on one hand, and reads the configuration information of other MCCHs on SIB 13 on the other hand, and the UE is able to read contents of other MCCHs. According to this/these MCCH contents, the UE may acquire different results.

2-1) TMGI1 is not carried on an MBSFN area corresponding to the other MCCH contents, and at the moment, behaviours and results of the UE are completely the same as those in the third embodiment.

2-2) TMGI1 is carried on one or more MCCHs on the other MCCH contents. In other words, TMGI1 is carried on one or more MBSFN areas (not MBSFN1), which may be assumedly indicated that TMGI1 is carried on MBSFN 2 corresponding to MCCH2, and TMGI1 may be also carried on MBSFN3/4 . . . corresponding to MCCH3/4 . . . . Behaviours of the UE in such a scenario will be expounded below.

In Scenario 2-2), the target cell 2 where the UE resides belongs to a plurality of other MBSFN areas (e.g. MBSFN2/3/4 . . . , except MBSFN1). In the plurality of overlapped MBSFN coverage areas to which cell 2 belongs, for example, the UE may acquire the content of TMGI1 from one or more MBSFN areas (e.g. MBSFN 2 and/or MBSFN4) among the MBSFN2/3/4/5 areas according to the following specific method: the UE reads SIB 13 of cell 2. If cell 2 belongs to the MBSFN2/3/4/5 coverage areas, the UE may read MBSFN2/3/4/5 configuration information in one-to-one correspondence to these 4 MBSFN areas, then the UE reads each MCCH message on a radio resource corresponding to each MCCH so as to know that configuration and scheduling information of MTCH1 (corresponding to TMGI1) are respectively indicated on MCCH2 and MCCH4. Finally, the UE reads MTCH1 (i.e. the TMGI1 content) on radio resources indicated by MCCH2 and MCCH4.

On the other hand, UE may also read MCCH1 on cell 2. That is, the UE may also not only read TMGI1 carried on other MBSFNs, but also read TMGI1 carried on MBSFN1 on cell 2. The UE may utilize a combining method (e.g. soft combination, or selective combination) to acquire a plurality of TMGI1 contents from different MBSFN areas (which may also include MBSFN1), so as to improve reception gain.

Embodiment 5

Figure 15:
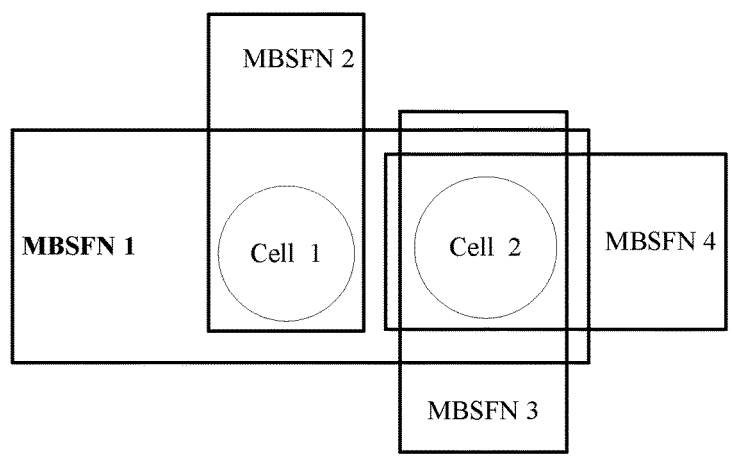
FIG. 15 is a schematic diagram illustrating that an UE continues to receive a service after the UE enters a new MBSFN areas without moving out of an original MBSFN area according to an embodiment of the present disclosure.

If Result 3) occurs, the cell has SIB 13 and the configuration information of MCCH1, which indicates that although the UE is reselected to cell 2 from cell 1, but the target cell 2 and cell 1 still belong to the same MBSFN1 area, thus the UE is switched in the same MBSFN area corresponding to MBSFN1. However, other MBSFN areas of cell 1 and cell 2 are different besides MBSFN 1, and the UE is moved out of or enter the MBSFN areas for the other MBSFN areas (besides MBSFN1). As shown in FIG. 15, the UE still belongs to MBSFN1 coverage in cell 2, is moved out of MBSFN2 coverage, but enters MBSFN3 and MBSFN4 coverage in the meanwhile.

After the UE performs cell reselection and resides in cell 2, the UE reads SIB 13 of the target cell 2, and may acquire configuration information of several MCCHs. The UE is able to not only know that cell 2 still belongs to MBSFN1, but also know a certain/some MBSFN areas to which cell 2 belongs. In other words, the UE is able to know whether an MBSFN area of cell 2 is completely the same as that of cell 1. Therefore, the present embodiment 3 may further include 2 scenarios as follows.

3-1) Cell 1 and cell 2 belong to completely the same MBSFN area. That is, all MBSFN areas (MBSFN1/2/3 . . . ) to which these 2 cells belong are completely the same.

In this scenario, after being reselected from the original cell 1 to the target cell 2, the UE acquires a TMGI according to completely the same method in cell 1 and cell 2, belonging to intra-MBSFN mobility.

3-2) Cell 1 and cell 2 belong to MBSFN areas that are not completely the same. In other words, although cell 1 and cell 2 are in MBSFN1 coverage, they belong to at least one other different MBSFN area in the meanwhile. It is assumed in the present embodiment that MBSFN4/5 . . . are different MBSFN areas.

In Scenario 3-2), after being reselected from the original cell 1 to the target cell 2, the UE continues to receive TMGI1 carried on MBSFN1 on one hand, and in the meanwhile, the UE may read MCCHs corresponding to other different MBSFN areas and finds whether TMGI1 is carried, and there will be 2 different results.

3-2-1) TMGI1 is not indicated by the MCCHs corresponding to the other MBSFN areas, a behaviour of the UE to acquire TMGI1 is completely the same as that in scenario 3-1. That is, after being reselected from the original cell 1 to the target cell 2, the UE acquires TMGI according to the completely the same method in cell 1 and cell 2, belonging to intra-MBSFN mobility.

3-2-2) TMGI1 is indicted by at least one MCCH among the MCCHs corresponding to the other MBSFN areas. The UE not only reads TMGI1 carried on MBSFN1 corresponding to MCCH1, and may also read TMGI1 carried on MBSFNs corresponding to the other MCCHs. The UE may utilize a combining method (e.g. soft combination, or selective combination) to acquire a plurality of TMGI1 contents from different MBSFN areas (which may also include MBSFN1), so as to improve reception gain.

To sum up, by applying the technical solutions of the embodiments of the present disclosure, after a UE leaves an original MBSFN area, the UE may utilize the characteristic that MCCH and MTCH signals sent by an MBSFN mode are strong to continue to receive an original service out of the original MBSFN area, thereby keeping the MBMS continuity when the UE moves between different MBSFNs. Besides, the UE continues to receive the original service out of the original MBSFN area on one hand, and on the other hand, notifies a network side to set up a new bearer, thereby ensuring service continuity to the largest extent.

A kind of software is further provided in another embodiment. The software is configured to implement the technical solutions described in the embodiments and exemplary embodiments.

A storage medium is further provided in another embodiment. The storage medium stores the software, and includes, but is not limited to an optical disk, a floppy disk, a hard disk, an erasable memory and so on.

Obviously, those skilled in the art should understand that, each component or each step of the present disclosure may be implemented by a universal computing device. They may be concentrated on a single computing device or distributed on a network composed of a plurality of computing devices. Optionally, they may be implemented by program codes executable by a computing device so that they may be stored in a storing device and executed by the computing device, and in some cases, they the steps as illustrated or described may be executed by sequences different from those described herein, or they may be implemented by respectively fabricating them into each integrated circuit component, or by fabricating a plurality of components or steps of them into a single integrated circuit component. In this way, the present disclosure is not limited to any specific combination of software and hardware.

The above are only exemplary embodiments of the present disclosure, and are not used for limiting the disclosure. For those skilled in the art, the present disclosure may have various alterations and variations. Any modification, equivalent replacement, improvement and so on made within the principle of the present disclosure should be included within the scope of protection defined by the appended claims of the present disclosure.

What is claimed is:

1. A method for sending indication information, comprising:
   determining, by User Equipment (UE), that the UE has left a Multimedia Broadcast Multicast Service (MBMS) over a Single Frequency Network (MBSFN) area capable of carrying a predetermined MBMS, wherein the predetermined MBMS is an MBMS that is being received or is prepared to be received before the UE leaves the MBSFN area;
   sending, by the UE in responsive to the determination that the UE has left the MBSFN area capable of carrying the predetermined MBMS, indication information to a network side so as to trigger the network side to set up, for the UE, a bearer for transmitting the predetermined MBMS;
   setting up for the UE, by the network side, a bearer for transmitting the predetermined MBMS, wherein setting up for the UE, by the network side, the bearer for transmitting the predetermined MBMS comprises: receiving, by the network side, the indication information sent by the UE, and replying, by the network side, an acknowledgement message carrying configuration information of the bearer to the UE; and receiving, by the UE, the acknowledgement message replied by the network side, and setting up, by the UE, the bearer according to the configuration information of the bearer carried in the acknowledgement message;
   continuing or starting to receive, by the UE, the predetermined MBMS through the bearer that is set up;
   the method further comprising:
   if the UE fails to receive, within a predetermined period of time after sending the indication information to the network side, the acknowledgement message replied by the network side, and the number of times that the UE sends the indication information to the network side has not reached a predetermined number of attempts, transmitting, by the UE, the indication information to the network side again.

2. The method as claimed in claim 1, wherein determining, by the UE, that the UE has left the MBSFN area capable of carrying the predetermined MBMS comprises one of the followings:
   in a case that the UE, after leaving an original cell and resides in a target cell, fails to acquire resource configuration information corresponding to the predetermined MBMS from a System Information Block (SIB) of the target cell, determining, by the UE, that the UE has left the MBSFN area capable of carrying the predetermined MBMS;
   in a case that the UE detects that signal quality of the predetermined MBMS currently being received is lower than a signal quality threshold value, determining, by the UE, that the UE has left the MBSFN area capable of carrying the predetermined MBMS; and
   in a case that the UE detects that a bit error rate of decoding the predetermined MBMS currently being received is higher than a bit error rate threshold value, determining, by the UE, that the UE has left the MBSFN area capable of carrying the predetermined MBMS.

3. The method as claimed in claim 2, wherein a situation that the UE fails to acquire the resource configuration information corresponding to the predetermined MBMS from the SIB of the target cell comprises:
   the UE fails to acquire configuration information of a Multicast Control Channel (MCCH) from the SIB of the target cell; or
   the UE acquires configuration information of the MCCH from the SIB of the target cell, but an MBSFN area corresponding to the MCCH in the SIB is not capable of carrying the predetermined MBMS.

4. The method as claimed in claim 2, further comprising:
when the UE fails to acquire the resource configuration information corresponding to the predetermined MBMS from the SIB of the target cell, continuing or starting to receive, by the UE, the predetermined MBMS in the target cell according to resource configuration information, which is acquired from an SIB of the original cell before leaving the original cell, corresponding to the predetermined MBMS.

5. The method as claimed in claim 4, wherein in a case that the UE is able to read, according to the resource configuration information, which is acquired from the SIB of the original cell before leaving the original cell, corresponding to the predetermined MBMS, an MCCH and a Multicast Traffic Channel (MTCH) corresponding to the resource configuration information, sending, by the UE, the indication information to the network side.

6. The method as claimed in claim 1, wherein
in a case that the UE is in an idle mode, sending, by the UE, the indication information to the network side comprises: initiating, by the UE, setup of a Radio Resource Control (RRC) connection, and after the RRC connection is set up successfully, sending, by the UE, the indication information to the network side through a dedicated signaling; and
in a case that the UE is in a connected mode, sending, by the UE, the indication information to the network side comprises: sending, by the UE, the indication information to the network side through a dedicated signaling.

7. The method as claimed in claim 1, wherein the network side is a base station, a core network element, or an application server,
in a case that the network side is the core network element, sending, by the UE, the indication information to the network side comprises: sending, by the UE, the indication information to a base station at the target cell, and forwarding, by the base station, the indication information to the core network element; and
in a case that the network side is the application server, sending, by the UE, the indication information to the network side comprises: sending, by the UE, the indication information to the base station at the target cell, forwarding, by the base station, the indication information to the core network element; and forwarding, by the core network element, the indication information to the application server providing the predetermined MBMS.

8. The method as claimed in claim 1, wherein the indication information comprises at least one of the following contents:
a flag for indicating that the UE has left the MBSFN area capable of carrying the predetermined MBMS;
an Identifier (ID) of an MBSFN area capable of carrying the predetermined MBMS;
a service ID of the predetermined MBMS; and
a request for setup of a bearer for transmitting the predetermined MBMS.

9. A device for sending indication information, located in User Equipment (UE), wherein the device comprises:
a first determining component, configured to determine that the UE has left a Multimedia Broadcast Multicast Service (MBMS) over a Single Frequency Network (MBSFN) area capable of carrying a predetermined MBMS, wherein the predetermined MBMS is an MBMS that is being received or is prepared to be received before the UE leaves the MBSFN area; and an indicating component configured to, in a case that the first determining component determines that the UE has left the MBSFN area capable of carrying the predetermined MBMS, send indication information to a network side so as to trigger the network side to set up, for the UE, a bearer for transmitting the predetermined MBMS;
the device is further configured to:
receive an acknowledgement message replied by the network side after receiving the indication information sent by the UE, wherein the acknowledgement message carries configuration information of the bearer;
set up the bearer for transmitting the predetermined MBMS according to the configuration information of the bearer carried in the acknowledgement message; and
continue or start to receive the predetermined MBMS through the bearer that is set up;
the device is further configured to:
if the device fails to receive, within a predetermined period of time after sending the indication information to the network side, the acknowledgement message replied by the network side, and the number of times that the UE sends the indication information to the network side has not reached a predetermined number of attempts, transmit the indication information to the network side again.

10. The device as claimed in claim 9, wherein the first determining component is configured to:
in a case that the UE, after leaving an original cell and resides in a target cell, fails to acquire resource configuration information corresponding to the predetermined MBMS from a System Information Block (SIB) of the target cell, determine that the UE has left the MBSFN area capable of carrying the predetermined MBMS; or
in a case that the UE detects that signal quality of the predetermined MBMS currently being received is lower than a signal quality threshold value, determine that the UE has left the MBSFN area capable of carrying the predetermined MBMS; or
in a case that the UE detects that a bit error rate of decoding the predetermined MBMS currently being received is higher than a bit error rate threshold value, determine that the UE has left the MBSFN area capable of carrying the predetermined MBMS.

11. The device as claimed in claim 10, wherein the first determining component is configured to determine, in the following conditions, that the UE fails to acquire the resource configuration information corresponding to the predetermined MBMS from the SIB of the target cell:
configuration information of a Multicast Control Channel (MCCH) fails to be acquired from the SIB of the target cell; or
configuration information of the MCCH is acquired from the SIB of the target cell, but an MBSFN area corresponding to the MCCH in the SIB is not capable of carrying the predetermined MBMS.

12. The device as claimed in claim 10, further comprising:
a first receiving component configured to, in a case that the first determining component determines that the UE fails to acquire the resource configuration information corresponding to the predetermined MBMS from the SIB of the target cell, continue or start to receive the predetermined MBMS in the target cell according to resource configuration information, which is acquired from an SIB of the original cell before leaving the original cell, corresponding to the predetermined MBMS.

13. The device as claimed in claim 12, wherein the indicating component is configured to, in a case that the first determining component determines that the UE fails to acquire the resource configuration information corresponding to the predetermined MBMS from the SIB of the target cell, and the first receiving component is able to read, according to the resource configuration information, which is acquired from the SIB of the original cell before leaving the original cell, corresponding to the predetermined MBMS, a corresponding MCCH and a corresponding Multicast Traffic Channel (MTCH), send the indication information to the network side.

14. The device as claimed in claim 12, wherein the first receiving component is further configured to, after the network side sets up for the UE, a bearer for transmitting the predetermined MBMS, continue or start to receive the predetermined MBMS through the bearer that is set up.

15. The device as claimed in claim 9, wherein the indication information comprises at least one of the following contents:
    a flag for indicating that the UE has left the MBSFN area capable of carrying the predetermined MBMS;
    an Identifier (ID) of an MBSFN area capable of carrying the predetermined MBMS;
    a service ID of the predetermined MBMS; and
    a request for setup of a bearer for transmitting the predetermined MBMS.

16. User Equipment (UE), comprising the device for sending the indication information as claimed in claim 9.

* * * * *